Oct. 27, 1959     L. J. G. BURSKI     2,910,610

LIGHTING CONTROL SYSTEM

Filed May 24, 1956

INVENTOR.
Leonard J. G. Burski
BY
Johnson and Kline
ATTORNEYS

United States Patent Office 2,910,610
Patented Oct. 27, 1959

2,910,610

LIGHTING CONTROL SYSTEM

Leonard J. G. Burski, Bristol, Conn., assignor to The Superior Electric Company, Bristol, Conn., a corporation of Connecticut Application May 24, 1956, Serial No. 586,953

5 Claims. (Cl. 313—276)

The present invention relates to a lighting control system and more particularly to a lighting system for changing the degree of brilliancy of a lamp circuit from one presettable illuminating value to another presettable value.

The lighting control system of the present invention is of particular utility when utilized as stage lighting, such as in theatres, cinemas and other places of entertainment performances wherein the degree of illumination is varied to effectuate the desired visible sensuality. Commonly, in such a system, there is a lamp load consisting of a plurality of electric lights, connected to a source of alternating current with an electric valve means interposed between the lamps and the source. The brilliancy of the lamps is varied by the electric valve means, which may be a variable resistance, but it is presently preferred to utilize a saturable reactor or magnetic amplifier to control the power to the lamp load for reasons well known in the art. The effect of the saturable reactor is regulated by the amount of current in the control winding which is preferably unidirectional to produce the required flux in the saturable reactor. The brilliancy of the lamps is generally proportional to the amount of control current, and accordingly, a variable current controlling device is positioned between a source and the control winding on the magnetic amplifier to vary the effect of the latter. Such a unit is commonly referred to in the trade as a "preset." In a theatre lighting circuitry there are a plurality of "presets" for one lamp load in order to enable the operator to set the lamps for the next desired degrees of brilliancy while one "preset" is presently controlling the lamps. Though mechanical switching may be provided for instantaneous switching from one "preset" to another, it is presently preferred to combine instantaneous switching with a device for permitting the transition from one "preset" to another at a gradually linear rate. This latter device is commonly called the "fader" in the trade, since it permits "fading" from one "preset" value of brilliancy to the next "preset" value.

It is an object of the present invention to provide a control system of the type referred to above which employs a minimum amount of apparatus and control circuits and which is simple, reliable and economical to fabricate.

It is another object of this invention to provide a "preset" as above referred to which is connectible to an A.C. source and provides for substantially complete effective rectification of the A.C. and applies a unidirectional current to the control windings whereby the "preset" may be advantageously located remote from the saturable reactor with only a small unidirectional current flowing therebetween.

It is a further object of this invention to provide a "fader" and "presets" as mentioned above in which the instantaneous values of alternating current flowing therethrough are equal in both directions when changing from one "preset" to the other, in which during such transition the current in the control coil flows through a portion of both "presets" and in which the brilliancy is directly proportional to the percentage of line voltage in each "preset."

A feature of the present invention resides in the utilization of a full wave rectifier with each "preset" control. The rectifier as thus employed not only converts the alternating current into a unidirectional direct current but also serves as a valve means when changing from one "preset" to another to permit feeding through a portion of both rectifiers, the current flowing in the control windings. Such construction permits an absolutely linear changing over from one "preset" value to another and during the transition the value of unidirectional current through the control current is the same for opposite instantaneous values of alternating current.

Other features and advantages will hereinafter appear.

Figure 1:
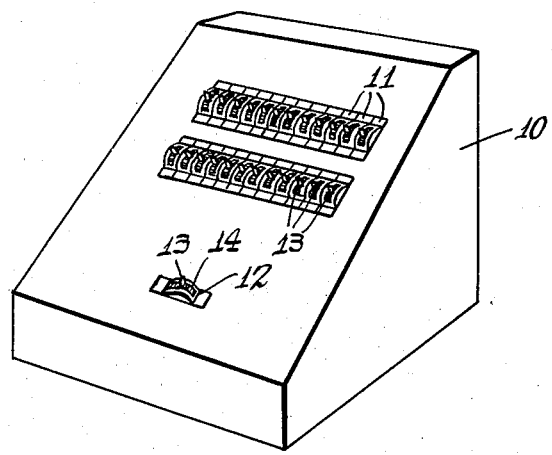
Figure 1 is a perspective view of a control board.

Referring to Fig. 1, there is shown the control panel 10 having two rows of "presets," each "preset" being designated by the reference numeral 11 and a "fader" 12. Each of the "presets" 11 and the "fader" 12 have a manually operable member 13 for selecting the desired value thereof to control the brilliancy of the lamps. There is additionally provided a dial 14 attached to each member 13, for giving a visible indication of the setting, which dial preferably is translucent so as to be illuminated by the means contained within each "preset." Though there has been shown only two rows of "presets" it is to be understood that a plurality of rows may be utilized, with switching means for changing from one row of "presets" to another and also for connecting the "fader" 12 between any desired rows of "presets." Though a plurality of "presets" are shown in each row, it is also within the scope of this invention to have only one.

Figure 2:
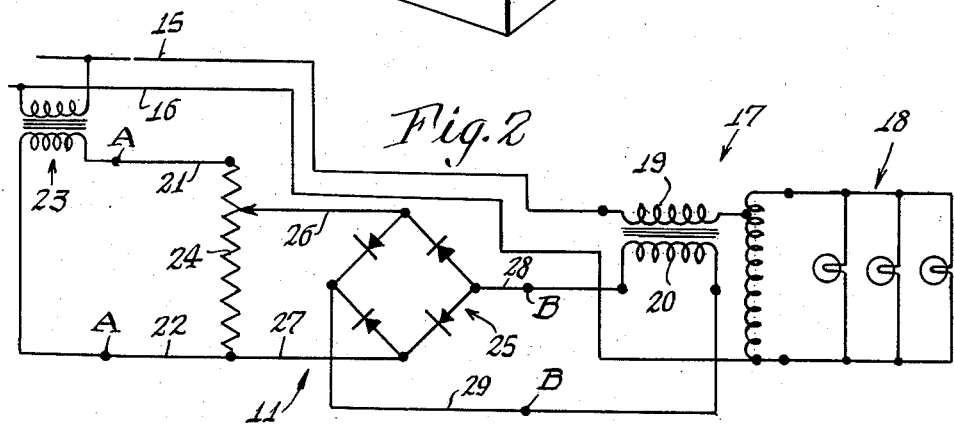
Fig. 2 is a schematic diagram of a "preset" or presettable control unit.

Fig. 2 illustrates the schematic diagram showing the connections for one "preset." A pair of leads 15 and 16 are connected to an alternating current source and to a magnetic amplifier, generally indicated by the reference numeral 17. A lamp load 18 shown as composed of a plurality of lamps, though only one may be utilized if desired, is connected to the output of the magnetic amplifier. The magnetic amplifier has load windings 19 and control windings 20. It will be understood by those skilled in the art that variations of current in the control windings vary the flux in the magnetic amplifier and the impedance of the amplifier to the passage of alternating current through the load windings to thereby control the power and hence the brilliancy of the lamps.

The "presets," generally indicated by the reference numeral 11, has a pair of input leads 21 and 22 which are connected to the alternating current input leads 15 and 16. Preferably, in order to have only small voltages through the "preset" to reduce line losses when the "preset" is located remote from the magnetic amplifier 17, a transformer 23 is employed. A potential divider 24 which is preferably a wire wound resistor, though other voltage selecting devices may be employed, is positioned across the leads 21 and 22 in order to permit the desired amount of alternating current to be selected. A full wave rectifier 25 which may be four diode rectifiers but preferably is a bridge selenium rectifier has one of its input points connected to a tap 26 operable on the potential divider 24. The input lead 22 by means of a wire 27 is connected to the other input point of the rectifier. Leads 28 and 29 connect the output of the rectifier 25 to the control winding 20 of the magnetic amplifier 17.

Movement of the tap 26 on the potential divider 24 varies the voltage across the rectifier 25 and hence the amount of flux in the control winding 20. This controls the brilliancy of the lamps by changing the alternating current into the substantially completely rectified unidirectional current which flows in the control winding 20.

Figure 3:
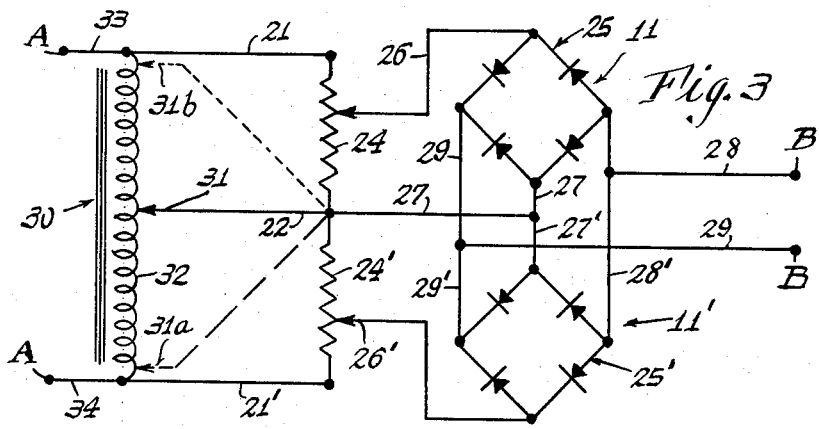
Fig. 3 is a schematic diagram of the connections between two "presets" and a "fader" for changing from one "preset" to another.

When it is desired to change from one scene to another, i.e., from one "preset" to another, switching connects two "presets" to a "fader" in the manner shown in the schematic illustration in Fig. 3.

Like reference numerals are used to indicate the same "preset" elements shown in Fig. 2 while similar reference numerals but with a prime are used to indicate similar elements in the second "preset" 11'. As shown, a wire 27' is connected from an input point of a rectifier 25' to wire 27 while leads 28' and 29' are connected to the leads 28 and 29, leading to the control coil 20. The circuit shown in Fig. 3 is designed to be positioned with relation to the A.C. source and magnetic amplifier as a substitute for the "preset" shown in Fig. 2, and accordingly, the points A—A are connected to the points A—A in Fig. 2 and the points B—B are connected to the points B—B in Fig. 2. A "fader," which may be a variable voltage divider, and in the instant embodiment is a variable autotransformer is connected by leads 33 and 34 to the output of the transformer 23. The autotransformer 30 has a brush 31 movable on a winding 32 to control the transition from one "preset" to the other. If desired, the transformer 23 may be eliminated by utilizing an autotransformer having all of its winding positioned across the leads 15 and 16, by having the leads 21 and 21' connected to the winding to have only a portion of the winding therebetween and by having the brush 31 travel only on this portion. However, with the present embodiment shown, the ends of the winding 32 are connected by leads 21 and 21' to an end of resistors 24 and 24' with the other ends of the resistors connected together and to the brush 31 by line 22.

In the operation of the illumination control system when it is desired to have the brilliancy of the lamps controlled only by the "preset" 11, the brush 31 is located on the broken line position, indicated by the reference numeral 31a. This positions the resistor 24 effectively across leads 33 and 34 so as to have the maximum source voltage across on the resistor 24. The tap 26 has been or may be preset or adjusted to give the desired current through the control coil 20. Accordingly, the desired value of current will flow (assuming the lead 33 to be instantaneously positive) through the lead 21, tap 26, bridge rectifier 25, through the lead 29, the control coil 20, lead 28, rectifier 25, wire 27, lead 22, brush 31a and to the line 34. When it is desired to have the brilliancy controlled only by the "preset" 11', the brush 31 is located in the position indicated by reference numeral 31b, which places the maximum A.C. source voltage across the resistor 24'. Current will flow through the lead 33, brush 31b, wire 27, bridge rectifier 25', lead 29', the control coil 20, lead 28', rectifier 25' and back through the tap 26', lead 21' and to the lead 34.

It will be apparent that when the brush 31 is in the position 31a or 31b that only one "preset" controls the brilliancy of the lamps, either "preset" 25 or 25' respectively.

When it is desired to change from one "preset" to another, it can either be done instantaneously, i.e., by switching the brush 31 from 31a to the position 31b or it can be done gradually by moving the brush 31 along the winding 32 from position 31a to position 31b. When the brush is located between these two positions, i.e., 31a and 31b, neither "preset" is in complete control but the values of the control current in the control depend on the setting of each of the taps 26 and the percentage of the maximum A.C. source voltage across each resistor 24. By utilizing such a construction, there is an absolutely linear change over from one "preset" to the other.

That is, as the brush 31 moves to increase the source voltage across the resistor 24', for example, the value of the current in the control coil approaches the setting of the "preset" 11' in direct proportion to the percentage of the source voltage on the resistor 24'. Moreover, during this transition period the instantaneous values of the A.C. current flowing in opposite directions is equal in the circuit. This is caused by the current in the control coil flowing through a portion of one rectifier bridge and then through a portion of the other. Accordingly, if we assume that the brush 31 is in the solid line position shown in Fig. 3 and that line 33 is instantaneously positive, current will flow through the lead 21, resistor 24, tap 26, bridge rectifier 25, lead 29, control coil 20, lead 28, lead 28', through the rectifier bridge 25' to tap 26', a portion of resistor 24', line 21' and to the line 34. Thus, the value of the current in the control coil will depend upon the voltage across each resistor 24 as determined by the setting of the brush 31, which in turn, determines the voltage drop caused by the taps 26 and thus, the current bears a linear function to the location of the brush 31 along the winding 32.

From the foregoing, there has been disclosed a lighting control system in which there are a plurality of "presets," each "preset" having an adjustable element and a full wave bridge rectifier in order to provide a full wave rectification of the A.C. input. Additionally, there is provided a variable means for impressing the A.C. voltage on either one or the other of the "presets" and for causing transition from one "preset" to the other. During this transition not only do the bridge rectifiers serve to rectify the A.C. current but also one portion of each serves as a conducting element for the current through the control coil. By such an arrangement the linear transition from one "preset" to the next is accomplished without the necessity of having complex circuitry and a multitude of electrical components.

Variations and modifications may be made within the scope of the claims and portions of the improvements may be used without others.

I claim:

1. A lighting control unit for producing a unidirectional signal usable to regulate the illumination from a lamp load from one value to another comprising a pair of leads connectible to a source of alternating current; an adjustable voltage unit having its input connected across the leads and having a movable tap; a first adjustable current controller having its input electrically connected across one lead and the tap and having a pair of output connections; a second adjustable current controller having its input electrically connected across the other lead and the tap and having a pair of output connections; a pair of output leads of the control unit; a rectifier connected to one of the output connections of each controller; and connections connecting the rectifiers in parallel to one output lead, and the other connection of each controller in parallel to the other output lead whereby operation of the tap from one extreme position to the other causes the signal to be shifted from the value set by one controller to the value set by the other.

2. A lighting control unit for producing a unidirectional signal usable to regulate the illumination from a lamp load from one value to another comprising a pair of leads connectible to a source of alternating current; an adjustable voltage unit connected across the leads and having a movable tap; a first rheostat having its input connected across one lead and the tap and a pair of output connections; a second rheostat having its input connected across the other lead and the tap and a pair of output connections; a pair of output leads; connections connecting one of each of the output connections in parallel and to one of the output leads and the other connections in parallel to the other output lead and the tap, said connections including rectifier means for maintaining each of the output leads of the same polarity whereby operation of the tap from one extreme position to the other causes the signal to be shifted from the value set by one rheostat to the value set by the other.

3. A lighting control unit for producing a unidirectional signal usable to regulate the illumination from a lamp load from one value to another comprising a pair of leads connectible to a source of alternating current; an adjustable autotransformer connected across the leads and having a movable tap; a first rheostat connected across one lead and the tap and having a movable element; a second rheostat connected across the other lead and tap and having a movable element; a pair of output leads; and a rectifier connected to each of the movable elements and connections connecting the rectifiers in parallel to one output lead and the other output lead to the tap whereby operation of the tap from one extreme position to the other causes the signal to be shifted from the value set by one rheostat to the value set by the other.

4. The invention as defined in claim 3 in which each of the rectifiers is a full wave rectifier for enabling full wave rectification of the alternating current.

5. A lighting control system for producing a signal to regulate the illumination from a lamp load comprising a pair of leads connectible to a source of alternating current; an adjustable voltage unit connected across the leads and having a movable tap; a first presettable controller comprising a rheostat having its input connected across one lead and the tap and having a rectifier in one of its two output connections; a second presettable controller comprising a rheostat having its input connected across the other lead and the tap and having a rectifier in one of its two output connections; a pair of output leads; and connections connecting the two rectifiers in parallel to one output lead and the other output connections of each controller in parallel to the other output lead and the tap whereby operation of the tap from one extreme position to the other causes the signal to be shifted from the value set by one controller to the value set by the other.

References Cited in the file of this patent

UNITED STATES PATENTS

| | | |
|---|---|---|
| 1,926,423 | Barclay | Sept. 12, 1933 |
| 2,458,277 | Lark | Jan. 4, 1949 |
| 2,462,371 | Engle | Feb. 22, 1949 |